United States Patent
Shea et al.

(10) Patent No.: US 11,599,914 B2
(45) Date of Patent: Mar. 7, 2023

(54) PROGRAMMATIC INGESTION AND ZONED CABLE DELIVERY OF LINEAR TV IN AD AUCTION ENVIRONMENTS

(71) Applicant: Beachfront Media LLC, Ormond Beach, FL (US)

(72) Inventors: Richard Shea, St. Augustine, FL (US); Daniel Church, Long Island City, NY (US); Frank Sinton, Ormond Beach, FL (US)

(73) Assignee: Beachfront Media LLC, Ormond Beach, FL (US)

( * ) Notice: Subject to any disclaimer, the term of this patent is extended or adjusted under 35 U.S.C. 154(b) by 0 days.

(21) Appl. No.: 16/877,453

(22) Filed: May 18, 2020

(65) Prior Publication Data

US 2021/0357987 A1 Nov. 18, 2021

(51) Int. Cl.
*G06Q 30/02* (2012.01)
*G06Q 30/0273* (2023.01)
*G06Q 30/0241* (2023.01)
*G06Q 30/0201* (2023.01)

(52) U.S. Cl.
CPC ..... *G06Q 30/0275* (2013.01); *G06Q 30/0201* (2013.01); *G06Q 30/0277* (2013.01)

(58) Field of Classification Search
CPC ........... G06Q 30/0275; G06Q 30/0277; G06Q 30/0201
See application file for complete search history.

(56) References Cited

U.S. PATENT DOCUMENTS

| | | | | |
|---|---|---|---|---|
| 2008/0127249 A1* | 5/2008 | Cruice | ................... | H04N 7/163 725/34 |
| 2008/0167943 A1* | 7/2008 | O'Neil | ................... | G06Q 30/02 705/7.34 |
| 2010/0191600 A1* | 7/2010 | Sideman | ............... | G06Q 30/02 705/14.53 |

(Continued)

OTHER PUBLICATIONS

A Near Optimal Bidding Strategy for Real Time Display Advertising Auctions Srinivas Tunuguntla and Paul R Hoban (Year: 2020).*

(Continued)

*Primary Examiner* — Victoria E. Frunzi
(74) *Attorney, Agent, or Firm* — Haynes Beffel & Wolfeld, LLP; Ernest J. Beffel, Jr.

(57) ABSTRACT

Disclosed is delivering and closing out viewership priced spots in zoned cable delivery of linear TV, assembling past measured viewership data within a zone for a TV spot in a program, by aggregating records and augmenting aggregated logs with viewers' demographic data. This includes running an automated auction for advertising, at five minutes or less before airtime, announcing the spot, providing the past viewership data augmented with demographic data, with bids accepted for a rate, accepting and selecting a winning bid, provisioning an ad corresponding to the winning bid rate for an operator to deliver to the zone, after selecting the bid and before the airtime. After airing the ad, included is processing collected delivery logs within ten minutes of receipt, calculating current measured viewership during the spot, calculating an extended price, and reporting to a winning bidder the extended price, within six hours of airing the ad.

20 Claims, 11 Drawing Sheets

(56) References Cited

U.S. PATENT DOCUMENTS

| | | | | |
|---|---|---|---|---|
| 2014/0244488 | A1* | 8/2014 | Kim | H04L 1/1614 705/39 |
| 2015/0058138 | A1* | 2/2015 | Schler | G06Q 30/0275 705/14.71 |
| 2015/0100436 | A1* | 4/2015 | Spofford | G06Q 30/0275 705/14.71 |
| 2016/0353147 | A9* | 12/2016 | Haberman | H04N 21/25883 |
| 2020/0107061 | A1* | 4/2020 | Huber | H04N 21/25883 |

OTHER PUBLICATIONS

"Digital Program Insertion—Advertising Systems Interfaces Part 1 Advertising Systems Overview", ANSI/SCTE 130-1 2013, Society of Cable Telecommunications Engineers, Engineering Committee, Digital Video Subcommittee, American National Standard, standards@scte.org, 20 pages.

"Digital Program Insertion—Advertising Systems Interfaces Part 2 Core Data Elements", ANSI/SCTE 130-2 2014, Society of Cable Telecommunications Engineers, Engineering Committee, Digital Video Subcommittee, American National Standard, standards@scte.org, 78 pages.

"Digital Program Insertion—Advertising Systems Interfaces Part 3 Ad Management Service (ADM) Interface", ANSI/SCTE 130-3 2013, Society of Cable Telecommunications Engineers, Engineering Committee, Digital Video Subcommittee, American National Standard, standards@scte.org, 306 pages.

"Digital Program Insertion—Advertising Systems Interfaces Part 4 Content Information Service CIS", ANSI/SCTE 130-4 2015, Society of Cable Telecommunications Engineers, Engineering Committee, Digital Video Subcommittee, American National Standard, standards@scte.org, 68 pages.

"Digital Program Insertion—Advertising Systems Interfaces Part 5 Placement Opportunity Information Service", ANSI/SCTE 130-5 2016, Society of Cable Telecommunications Engineers, Engineering Committee, Digital Video Subcommittee, American National Standard, standards@scte.org, 48 pages.

"Digital Program Insertion—Advertising Systems Interfaces Part 6 Subscriber Information Service (SIS)", ANSI/SCTE 130-6 2013, Society of Cable Telecommunications Engineers, Engineering Committee, Digital Video Subcommittee, American National Standard, standards@scte.org, 101 pages.

Levy, Advantages and Challenges of a Vast Server-Side Video Advertising Solutionj, Cisco, Service Provider Video Software & Solutions, France, 2016, 8 pages.

5 Things You Didn't Know About Your Local Cable Ad Buys, MMI Media Audits/Consulting, 5 pages (downloaded from https://www.mediaaudit.com/post/5-things-you-didnt-know-about-your-local-cable-ad-buys).

How to advertise on Cable TV in the Seattle Market and does it work?, Thrive Advertising, 13 pages, (downloaded https://thriveadvertisingco.com/should-i-advertise-on-cable-tv/#:~:text=Cable%20television%20advertising%20allows%20for,in%20their%20target%20geographic%20market).

The Power of Zoning, Cox Media, 4 pages (downloaded from https://www.mediaaudit.com/post/5-things-you-didnt-know-about-your-local-cable-ad-buys).

Limjap et al., Define realtime business, banking, Stack Overflow, Sep. 9, 2008, 4 pgs (downloaded from https://stackoverflow.com/questions/51135/define-realtime-on-the-web-for-business on Apr. 28, 2022).

Community et al., What constitutes 'real time', Stack Overflow, Sep. 17, 2008, 6 pgs (downloaded from https://stackoverflow.com/questions/80394/what-constitutes-real-time on Apr. 28, 2022).

Geving, The basics of media-buying Insights Tatari timeframe table, Tatari.tv, Feb. 14, 2018, 4 pgs (downloaded from http://www.tatari.tv/insights/basics-of-media-buying on Apr. 28, 2022).

* cited by examiner

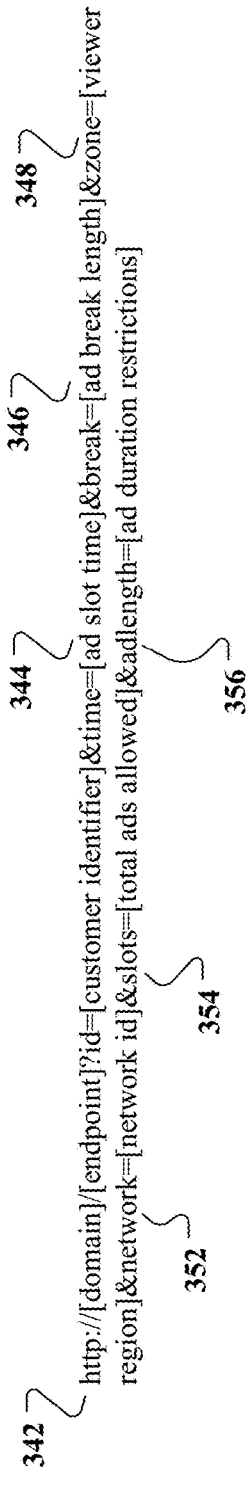

| HOUSEHOLD_ID | DEVICE_ID | ACTION_START | ACTION_DURATION | ACTION_END | TIMEZONE |
|---|---|---|---|---|---|
| 12345 | ABCDE | 2/25/2019 0:58 | 84112 | 2/26/2019 0:20 | AMERICA/CHICAGO |

| SOURCE_TYPE | CHANNEL_ID | NETWORK_CALLSIGN | PLAYBACK_DURATION_SECONDS | ZIP_CODE | COUNTRY |
|---|---|---|---|---|---|
| BROADCAST | 50469 | NBC | 84112 | 75006 | USA |

342 http://[domain]/[endpoint]?id=[customer identifier]&time=[ad slot time]&break=[ad break length]&zone=[viewer region]&network=[network id]&slots=[total ads allowed]&adlength=[ad duration restrictions]

| Impression ID | Timestamp | CPM | Break ID | Break Position | Network | Entertainment Asset | Advertiser | Ad ID |
|---|---|---|---|---|---|---|---|---|
| 1 | 2.30941E+12 | 15.34 | ABC | 2 | NBC | ABC123 | Advertiser A | 12 |

| Ad Duration | Zone | Estimated Audience Size | Actual Audience Size | Segments | Segment Size |
|---|---|---|---|---|---|
| 30 | 3 | 12500 | 13400 | M25-45 | 9000 |

```
<Asset>
<Metadata>
<AMS Asset_Name="AAAA5be4ed76_Title_2919980" Provider="ADSTORONE_ADS" Product="ADTV"
Version_Major="1" Version_Minor="4" Description="AAAA5be4ed76" Creation_Date="2018-11-09"
Provider_ID="adstorone.net" Asset_ID="ADST181109023127504" Asset_Class="title" Verb="DELETE"/>
<App_Data App="ADTV" Name="Type" Value="title"/>
<App_Data App="ADTV" Name="Destination_Platforms" Value="VODHD,VODSD"/>
<App_Data App="ADTV" Name="Licensing_Window_Start" Value="2018-11-09T00:00:01"/>
<App_Data App="ADTV" Name="Licensing_Window_End" Value="2019-05-08T23:59:59"/>
<App_Data App="ADTV" Name="MSV_Association" Value="ADSP180123055309174"/>
<App_Data App="ADTV" Name="Alt_Code" Value="ADSP180123055309174"/>
<App_Data App="ADTV" Name="IsSubscription" Value="N"/>
<App_Data App="ADTV" Name="Summary_Long" Value="CCH Creative"/>
<App_Data App="ADTV" Name="Summary_Medium" Value="CCH Creative"/>
<App_Data App="ADTV" Name="Category_Display" Value="Help & Services/AdCopy"/>
<App_Data App="ADTV" Name="Content_Type" Value="MOV"/>
<App_Data App="ADTV" Name="Genre" Value="Advertising"/>
<App_Data App="ADTV" Name="Genre_Display" Value="Advertising"/>
<App_Data App="ADTV" Name="HD_Rights" Value="N"/>
<App_Data App="ADTV" Name="Purchase" Value="N"/>
<App_Data App="ADTV" Name="Rental" Value="N"/>
<App_Data App="ADTV" Name="Suggested_Price" Value="0.00"/>
<App_Data App="ADTV" Name="MPEG4" Value="N"/>
<App_Data App="ADTV" Name="Title_Sort_Name" Value="CCH Creative"/>
<App_Data App="ADTV" Name="Title_Brief" Value="CCH Creative"/>
<App_Data App="ADTV" Name="Title" Value="CCH Creative"/>
...
```

FIG. 4A

...
<App_Data App="ADTV" Name="Summary_Short" Value="CCH Creative"/>
<App_Data App="ADTV" Name="Rating" Value="G"/> ⎯ 434
<App_Data App="ADTV" Name="Closed_Captioning" Value="N"/>
<App_Data App="ADTV" Name="Run_Time" Value="00:00:14"/>
<App_Data App="ADTV" Name="Display_Run_Time" Value="00:01"/>
<App_Data App="ADTV" Name="Year" Value="2018"/>
<App_Data App="ADTV" Name="Category" Value="Help & Services/AdCopy"/> ⎯ 456
<App_Data App="ADTV" Name="Billing_ID" Value="00000"/>
<App_Data App="ADTV" Name="Preview_Period" Value="0"/>
<App_Data App="ADTV" Name="Display_As_New" Value="7"/>
<App_Data App="ADTV" Name="Display_As_Last_Chance" Value="7"/>
<App_Data App="ADTV" Name="Provider_QA_Contact" Value="AdStor_Support@comcast.com"/>
<App_Data App="ADTV" Name="Maximum_Viewing_Length" Value="01:00:00"/>
<App_Data App="ADTV" Name="FTR_Tags" Value=""/>
<App_Data App="ADTV" Name="HD_Purchase_Price" Value=""/>
<App_Data App="ADTV" Name="HD_Rental_Price" Value=""/>
<App_Data App="ADTV" Name="SD_Purchase_Price" Value=""/>
<App_Data App="ADTV" Name="SD_Rental_Price" Value=""/>
</Metadata>
</Asset>
</ADI>

FIG. 4B

```
 1 <vmap:VMAP xmlns:vmap="http://www.iab.net/vmap-1.0" version="1.0">                                    ─── 504
 2 <vmap:AdBreak breakId="jwLOcJRuEem8sQI7nk5uXQ==" breakType="linear">
 3 <vmap:AdSource allowMultipleAds="true" followRedirects="true" id="1">
 4 <vmap:VASTAdData>
 5 <VAST version="2.0">          ─── 514
 6 <Ad id="21252">
 7 <InLine>
 8 <AdSystem version="2.0">Beachfront Marketplace Ad</AdSystem>
 9 <AdTitle>
10 <![CDATA[ Ad Title ]]>
11 </AdTitle>
12 <Impression id="io-1">
13 <![CDATA[ http://stb.bfmio.com/track ]]>
14 </Impression>
15 <Impression id="io-2">
16 <![CDATA[ http://stb.bfmio.com/track ]]>
17 </Impression>
18 <Creatives>
19 <Creative id="5611">
20 <Linear>
21 <Duration>00:00:30</Duration>
22 <TrackingEvents>                                                 ─── 564
23 <Tracking event="start">
24 <![CDATA[ http://stb.bfmio.com/track ]]>
25 </Tracking>
26 <Tracking event="firstQuartile">
27 <![CDATA[ http://stb.bfmio.com/track ]]>
28 </Tracking>
29 <Tracking event="midpoint">
30 <![CDATA[ http://stb.bfmio.com/track ]]>
31 </Tracking>
...
```

FIG. 5A

```
...
61  </Creative>
62  </Creatives>
63  </InLine>
64  </Ad>
65  </VAST>
66  </vmap:VASTAdData>
67  </vmap:AdSource>
68  </vmap:AdBreak>
69  <vmap:AdBreak breakId="jwLOcpRuEem8sQI7nk5uXQ==" breakType="linear" timeOffset="00:11:22">
70  <vmap:AdSource allowMultipleAds="true" followRedirects="true" id="2">
71  <vmap:VASTAdData>
72  <VAST version="2.0"/>
73  </vmap:VASTAdData>
74  </vmap:AdSource>
75  </vmap:AdBreak>
76  <vmap:AdBreak breakId="jwLOc5RuEem8sQI7nk5uXQ==" breakType="linear" timeOffset="00:17:57">
77  <vmap:AdSource allowMultipleAds="true" followRedirects="true" id="3">
78  <vmap:VASTAdData>
79  <VAST version="2.0"/>
80  </vmap:VASTAdData>
81  </vmap:AdSource>
82  </vmap:AdBreak>
...
```

```
 83  <vmap:AdBreak breakId="jwL1gJRuEem8sQI7nk5uXQ==" breakType="linear" timeOffset="00:25:52">
 84  <vmap:AdSource allowMultipleAds="true" followRedirects="true" id="4">
 85  <vmap:VASTAdData>                    543
 86  <VAST version="2.0">
 87  <Ad id="21242">
 88  <InLine>
 89  <AdSystem version="2.0">Beachfront Marketplace Ad</AdSystem>
 90  <AdTitle>
 91  <![CDATA[ Ad Title ]]>
 92  </AdTitle>
 93  <Impression id="io-1">
 94  <![CDATA[ http://stb.bfmio.com/track ]]>
 95  </Impression>
 96  <Impression id="io-2">
 97  <![CDATA[ http://stb.bfmio.com/track ]]>
 98  </Impression>
 99  <Creatives>
100  <Creative id="5611">
101  <Linear>
102  <Duration>00:00:30</Duration>
103  <TrackingEvents>
104  <Tracking event="start">
105  <![CDATA[ http://stb.bfmio.com/track ]]>
106  </Tracking>
107  <Tracking event="firstQuartile">
108  <![CDATA[ http://stb.bfmio.com/track ]]>
109  </Tracking>
110  <Tracking event="midpoint">
111  <![CDATA[ http://stb.bfmio.com/track ]]>
112  </Tracking>
113  <Tracking event="thirdQuartile">
114  <![CDATA[ http://stb.bfmio.com/track ]]>
115  </Tracking>
```

FIG. 5D

```
...
116 <Tracking event="complete">
117 <![CDATA[ http://stb.bfmio.com/track ]]>
118 </Tracking>
119 <Tracking event="close">
120 <![CDATA[
121 http://stb.bfmio.com/track<![CDATA[http://stb.bfmio.com/track
122 ]]>
123 </Tracking>
124 </TrackingEvents>
125 <VideoClicks>
125 </VideoClicks>
126 <ClickThrough id="5611"/>
127 <ClickTracking>
128 <![CDATA[ http://stb.bfmio.com/track ]]>
129 </ClickTracking>
130 </VideoClicks>
131 <MediaFiles>
132 <MediaFile delivery="progressive" type="external/vod-asset-identifier" width="1920" height="1080">
133 <![CDATA[ ASSET_PATH ]]>
134 </MediaFile>
135 <MediaFile delivery="progressive" type="external/vod-asset-identifier" width="640" height="480">
136 <![CDATA[ ASSET_PATH ]]>
137 </MediaFile>
138 </MediaFiles>
139 </Linear>
140 </Creative>
141 </Creatives>
142 </InLine>
143 </Ad>
144 </VAST>
145 </vmap:VASTAdData>
146 </vmap:AdSource>
147 </vmap:AdBreak>
148 </vmap:VMAP>
```

FIG. 5E

PROGRAMMATIC INGESTION AND ZONED CABLE DELIVERY OF LINEAR TV IN AD AUCTION ENVIRONMENTS

INCORPORATIONS

The following materials, SCTE 130-1 2013: Digital Program Insertion—Advertising Systems Interfaces Part 1—Overview; SCTE 130-2 2014: Digital Program Insertion—Advertising Systems Interfaces Part 2—Core Data Elements; SCTE 130-3 2013: Digital Program Insertion—Advertising Systems Interfaces Part 3—Ad Management Service (ADM) Interface; SCTE 130-4 2015: Digital Program Insertion—Advertising Systems Interfaces Part 4—Content Information Service; SCTE 130-5 2016: Digital Program Insertion—Advertising Systems Interfaces Part 5—Placement Opportunity Information Service; and SCTE 130-6 2013: Digital Program Insertion—Advertising Systems Interfaces Part 6—Subscriber Information Service are incorporated by reference for all purposes as if fully set forth herein.

FIELD OF THE TECHNOLOGY DISCLOSED

The technology disclosed relates generally to systems and methods for preparing advertising for insertion in entertainment content delivered by broadcast cable providers, including systems and methods compatible with versions SCTE 130 in effect in July 2019. The disclosed technology implements formatting and uploading ads (aka creative content) to a content information system operated by or on behalf of a broadcast cable provider, coupled with processing placement requests. The technology disclosed is so much faster and better integrated and streamlined than prior SCTE 130 systems that it can ingest, format and upload new content after a successful real time bid for placement, in time for showing at the specified ad slot in the entertainment content being delivered by the cable content that triggered the placement request.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Content distributors want to maximize the value of the ad inventory they sell. Retargeting, also referred to as remarketing, is an early example of addressable marketing in the digital space. With the help of addressable advertising, advertisers can move beyond large-scale traditional TV ad buys, to focus on relevance and impact.

SCTE-130 is a standard from the Society of Cable Telecommunications Engineers (SCTE) for a unified platform framework for addressable advertising. The SCTE-130 standard consists of a set of XML-based protocols which will work in traditional cable deployments such as setup boxes, for linear programming. SCTE-130 defines the framework for picking, on the fly, which ad, of which length, to splice into a TV show.

An opportunity arises to streamline use of the SCTE 130 framework for delivering and closing out viewership priced spots in zoned cable delivery of linear TV.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3A shows an example entry for a cable delivery zone log.

FIG. 3B illustrates an example AMS placement request from a broadcast cable provider for ad insertion into a program, in ad definition interface format.

FIG. 3C shows a single impression pixel made available after the created asset is delivered to the broadcast cable provider that plays the ad.

FIG. 4A and FIG. 4B show an example metadata file in ADI format for a creative asset.

FIG. 5A, FIG. 5B, FIG. 5C, FIG. 5D and FIG. 5E list an example VMAP that includes multiple VASTs.

DETAILED DESCRIPTION

Figure 1:
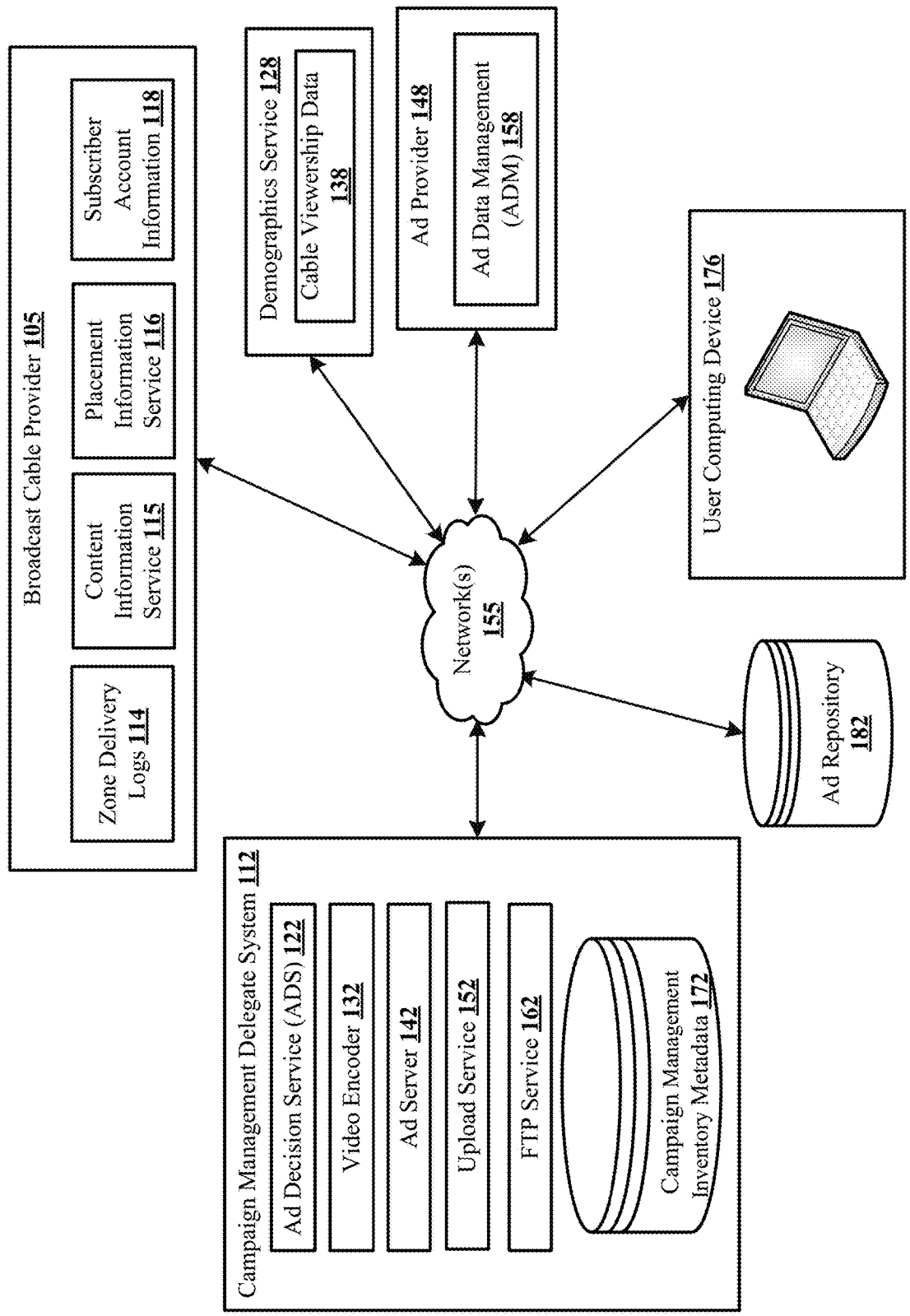
FIG. 1 shows an architectural level schematic of a system for delivering and closing out viewership priced spots in zoned cable delivery of linear TV, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The model of traditional linear television programming is for a schedule of shows to be selected by the broadcaster and then viewed at a set time. In this model, the viewer cannot fast forward through the programming or choose to watch it at a later time. Linear TV, also known as cable television, is the traditional form of TV that is offered by your cable provider. Linear television requires the viewer to scroll through channels to find their desired television program. Each program is aired on a specific channel at a certain time of day or night.

Linear advertising refers to a systematic schedule in which ads are designed to run for a specific time on a particular medium. Linear TV advertising targets demographics according to ratings and time of day. Advertisers pay for viewership based on the viewer ratings. Traditionally, actual viewership is estimated and not precise. The viewer must tune in to a specific channel at an appointed time to watch content on a traditional TV and viewership location is unclear. Rates are based on ratings and the ratings are based on estimates and projections of potential viewership at a specific time traditionally.

As the nature of TV audiences keeps shifting, broadcaster advertising needs also shift. An important area for broadcasters to grow their capabilities is with linear TV delivered to zones of users. Advertisers want an ad service to deliver their ads in a way that increases sales. A biddable sales channel for advertising can lead to an increase in demand for programmatic advertising sales. Programmatic advertising is the automated buying and selling of online advertising and it utilizes targeting tactics to segment audiences, using data, so that advertisers only pay for ads delivered to the right people at the right time. Real-time bidding (RTB) refers to the buying and selling of online ad impressions through real-time auctions. RTB is a means by which advertising inventory is bought and sold on a per-impression basis, via real time programmatic auction.

Events motivate the demand for a short lead time for delivering ads, such as a retailer placing ads for selling fans and air conditioning units in response to an unseasonable heat wave or selling space heaters during an unexpected cold snap. In another case, auto dealers want to clear out specific inventory at the end of the month. In a third example, unexpected disease outbreaks or unexplained deaths can motivate the need for just-in-time advertising such as opportunistic tourism promotion, responsive to negative publicity about competing destinations.

The disclosed technology for delivering and closing out viewership priced spots in zoned cable delivery of linear TV enables the delivery of targeted ads to zones of viewers, programmatically determining what ads to serve in near real time instead of existing technologies that create a schedule of ads the day before, or even longer before the ads are to be delivered to viewers. A targeted zone includes thousands of households typically. The disclosed zoned cable delivery of linear TV is served on the headend, delivering viewership priced targeted ads. The cable television headend is the master distribution center for receiving television signals for processing and distribution over a cable television system, where incoming television signals from video sources are received, amplified, and re-modulated onto TV channels for transmission down the cable television system for distribution to a local region. By serving at the headend, the ad stream can be changed from the national or regional stream to a separate ad stream that shows the targeted ads.

Multichannel video programming distributors (MVPD) deliver to viewers a wide variety of TV channels. MVPD are also referred to as cable or satellite or fiber optic system (FiOS) TV service, with examples such as Comcast, DirecTV, DISH, Cox Communications and Frontier. Each MVPD allows access to different data. The decision of how many impressions to be served is based on logs.

The disclosed technology accesses actual data, from cable delivery zone logs collected by the cable system operator corresponding to the linear TV spot, that reflect the viewership of served ads, yielding measured viewership during the linear TV spot that is close to 100% accurate and available within hours of the ads having been served. After delivering a created asset to the broadcast cable provider that plays the ad, a single impression pixel is logged that represents everyone watching that video on that channel at that time.

The disclosed technology enables near real time programmatic advertising sales for customer premise equipment (CPE) delivered by MVPD. By streamlining use of the SCTE 130 framework for delivery of advertising, MVPD can execute dynamic ad insertion in real-time, enabling advertisers to buy audiences instead of programs. The disclosed technology with delegated campaign management enables the buying and targeting of advertising to specific zones of viewers of linear TV. The disclosed technology can also enable the collection of sampled information for audiences of programmatically placed ad content.

An example system for delivering and closing out viewership priced spots in zoned cable delivery of linear TV is described next.

Architecture

FIG. 1 shows an architectural level schematic of a system 100 for delivering and closing out viewership priced spots in zoned cable delivery of linear TV. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes broadcast cable provider 105 such as Comcast, DirecTV, DISH, Cox Communications and Frontier, campaign management delegate system 112, household demographics service 128, ad provider 148, ad repository 182 and optionally, user computing device 176. Broadcast cable provider 105 operates content information service (CIS) 115 that manages metadata that describes the available assets, both advertising and entertainment, for the provider. CIS 115 allows querying of content and its existence. In one example, a CIS query can request the content belonging to a particular content provider. In another query example, CIS can request the content from the content distributor, video server, etc. Broadcast cable provider 105 operates placement opportunity information service (POIS) 116 that manages the descriptions of placement opportunities in the entertainment assets, including formats and ad maps, and specifies ownership of positions. Two parts of SCTE 130 specify protocols for CIS 115: SCTE 130-4 2011: Digital Program Insertion—Advertising Systems Interfaces Part 4—Content Information Service and POIS 116: SCTE 130-5 2010: Digital Program Insertion—Advertising Systems Interfaces Part 5—Placement Opportunity Information Service. These two SCTE 130 protocols are incorporated herein in full by reference. More than one broadcast cable provider 105 can make use of the disclosed streamlining use of the SCTE 130 framework for delivery of advertising, in some implementations.

Continuing the description of system 100, broadcast cable provider 105 stores subscriber account information 118 with audience and subscriber account names and identifiers of their customers. Broadcast cable provider 105 also collects and aggregates zone delivery logs 114 with event driven lists of viewing audience data, mapped to households and device identifiers for their customers. Continuing further with the description of the system, household demographics service 128 captures cable TV viewership data 138 with demographic segmentation, along with audience qualities. Any example demographic segment can be soccer moms or football viewing fans. Example demographic services include Acxiom Big Data and Experian Data Service. Portions of the captured demographic segmentation data, for the viewer and households identified in the delivery zone logs, augment the data in the aggregated zone delivery logs. That is, past viewership data is augmented with the demographic data.

Another element of system 100, campaign management delegate system 112 utilizes ad decision service (ADS) 122 that determines how to place the ads. Campaign management delegate system 112 also utilizes video encoder 132 that formats new content and ad server 142 that runs an automated auction for advertising in an identified linear TV spot. Ad server 142 announces the linear TV spot and can run the automated auction at a time of five minutes or less before airtime for the linear TV spot. Ad server 142 provides past measured viewership data augmented with the demographic data to the bidders and sets a deadline for bidding. Ad server 142 selects a winning bid for the linear TV spot, for a rate that will be applied to the measured viewership during the spot, and provisions the ad corresponding to the winning bid for a cable system operator to deliver to the cable delivery zone before the airtime for the linear TV spot. Ad server 142 accepts new content provided by a successful bidder, responsive to the placement request and bidding, determining what advertising content needs to be included with the program, in relation to time of day and type of content and in consideration of broadcast cable provider metadata, which includes advertising needs such as subscriber data and ad break setup for specific content. Service provider metadata typically includes the timing for each break in the entertainment, how many breaks are available and what type and how many ads are allowed in each break. Ad server 142 generates the video multiple ad playlist (VMAP) response with the results of the auction. Video encoder 132 automatically formats the new content, encoding selected ads in standard definition (SD) format and HD format with 1080p resolution. In another implementation, a different encoding format could be utilized to match an emerging technology that requires an additional video resolution. Ad server 142 looks up, in campaign management metadata 172, using the ad definition interface (ADI) metadata for the entertainment asset, typically a TV show or movie, to determine whether an ad asset is ready to serve to broadcast cable provider 105. Campaign management delegate system 112 also utilizes upload service 152, FTP service 162 and campaign management metadata 172. Upload service 152 uploads a VMAP to broadcast cable provider 105 and FTP service 162 sends the creative asset video file, the ad, to broadcast cable provider 105 in time for playback with content that prompted the placement request.

Further describing system 100, ad provider 148 includes ad data management 158 which originates messages articulating ad insertion, also referred to as ad placement, opportunities. Ad repository 182 stores campaign inventory, also referred to as creatives, for use by campaign management delegate system 112 to respond to placement requests by broadcast cable provider 105. Ad provider 148 can represent multiple different ad organizations that own ads and want to buy opportunities to air their ads during entertainment content delivered for zoned cable delivery. Ad data management 158 queries ADS 122 to determine what ads are appropriate to place inside the content. System 100 also includes network(s) 155 and user computing device 176 that includes a user interface for viewing previews in a creative review system.

In the interconnection of the elements of system 100, network 155 couples broadcast cable provider 105, campaign management delegate system 112, demographics service 128 and ad provider 148 in communication, along with user computing device 176 and ad repository 182. The communication path can be point-to-point over public and/or private networks. Communication can occur over a variety of networks, e.g. private networks, VPN, MPLS circuit, or Internet, and can use appropriate application program interfaces (APIs) and data interchange formats, typically XML. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Campaign management metadata 172 stores metadata information from one or more broadcast cable providers and one or more ad providers into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs. The assembled metadata can be stored in a semi-structured data format like JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. Ad repository 182 utilizes Amazon Simple Storage Service (S3), an object storage service, in one implementation. A different storage service can be used to store video creatives in a different implementation.

The components of FIG. 1 are implemented by software running on varying types of computing devices. Example devices are a workstation, a server, a computing cluster, a blade server, and a server farm, or any other data processing system or computing device. The broadcast cable provider 105, campaign management delegate system 112 and ad provider 148 can be communicably coupled to the databases via a different network connection. For example, broadcast cable provider 105 can be coupled via network(s) 155 (that is, the Internet) and campaign management delegate system 112 can be coupled to ad repository 182 via a direct network link.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a Bigtable™ compatible non-relational database implementation or an HBase™ or DynamoDB™ compatible non-relational database implementation.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

The Interactive Advertising Bureau (IAB) is comprised of more than 500 leading media and technology companies that are responsible for selling 86% of online advertising in the United States. A video ad serving template (VAST) is a template for structuring ad tags that serve ads, using an XML schema to transfer the metadata about an ad from an ad server to a media player. The IAB digital video multiple ad playlist (VMAP) is an XML template that video content owners and ad networks can use to schedule multiple ad insertions from a single tag. A VMAP is a collection of VASTs that video content owners use to describe the structure for ad inventory insertion, usable for real-time bidding (RTB). That is, the VMAP can be utilized to describe the structure for ad inventory insertion for regularly scheduled programming. VMAP defines the ad breaks within content, including the timing for each break, how many breaks are available, and what type of ads and how many are allowed in each break.

Figure 2:
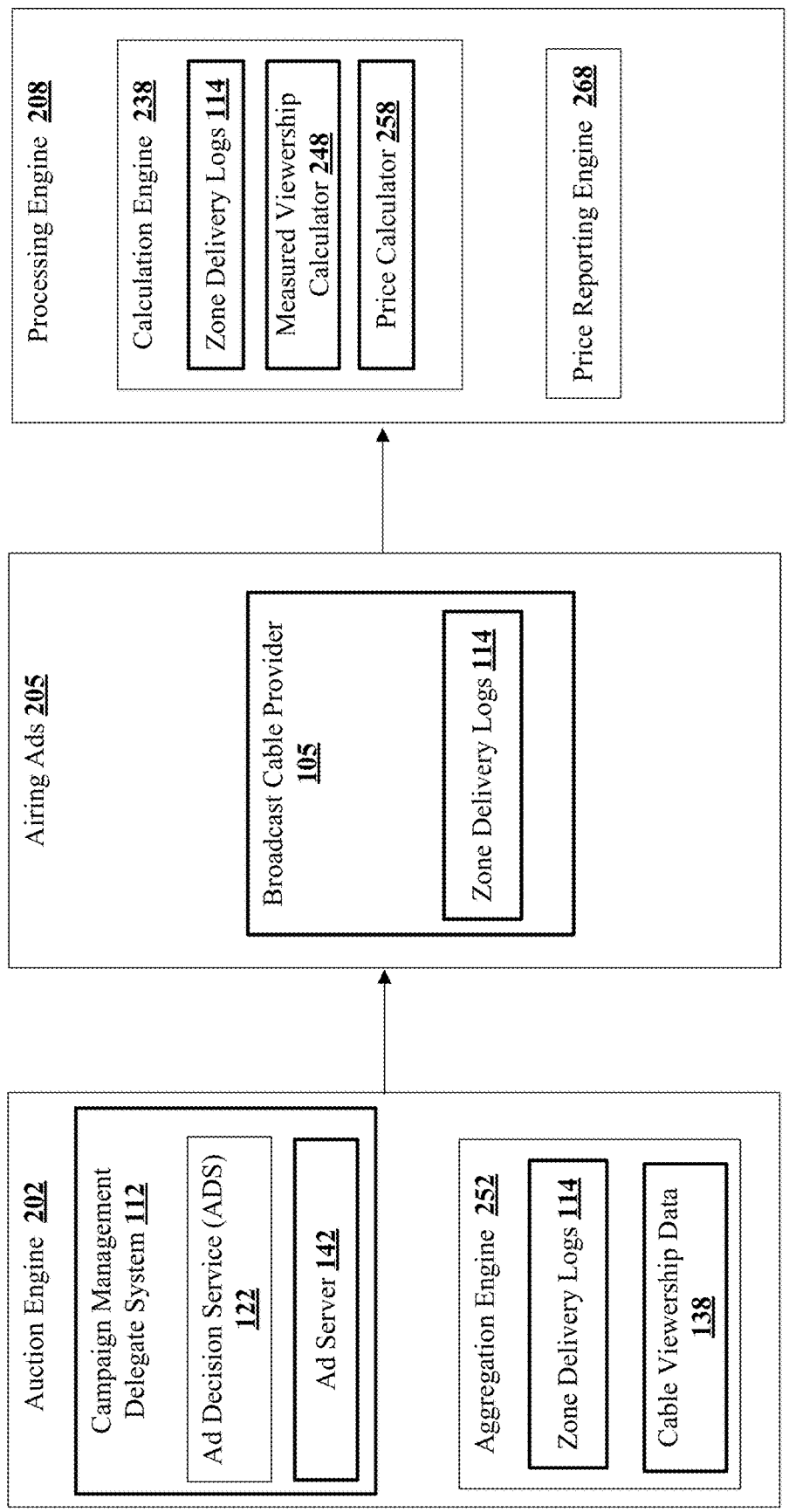
FIG. 2 shows an example block diagram for delivering and closing out viewership priced spots in zoned cable delivery of linear TV.
Figure 5B:

FIG. 2 shows an example block diagram for delivering and closing out viewership priced spots in zoned cable delivery of linear TV. Auction engine 202 assembles viewership data and runs an automated auction just before airtime for the liner TV spot, at a time of five minutes or less before airtime for the linear TV spot, including announcing the linear TV spot, providing the past measured viewership data augmented with the demographic data, and setting a deadline for bidding, with bids accepted for a rate that will be applied to measured viewership during the linear TV spot. Airing ads 205 utilizes broadcast cable provider 105 for airing the selected ad. After the ad airs, processing engine 208 accesses and processes the cable zone delivery logs 114.

Auction engine 202 utilizes ad server 142 that looks up the metadata for the entertainment asset in campaign management metadata 172 and uses the data for targeting a programmatic auction, also referred to as ad bidding, to match the entertainment. Ad bidding considerations include the status of ads that will potentially fill an ad slot. Aggregation engine 252 aggregates records in cable delivery zone logs 114 and assembles past measured cable viewership data 138 within a cable delivery zone for a linear TV spot, in a linear TV program, augmenting selected portions of the aggregated logs with demographic data for viewers or households identified in delivery zone logs 114. MVPD log data is non-standard; that is, the log data schema is unique to each broadcast cable provider 105. In one example, delivery zone logs 114 include the timing for each break in the entertainment, how many breaks are available and what type and how many ads are allowed in each break. An example set of fields that describe an entertainment asset in a delivery zone log is listed next.

Household Identifier
Device Identifier
Device Type
Action (started watching, stopped watching, changed channel/program)
Action Duration
Action Timestamp
Timezone/Zipcode/Country
Source (Video On Demand, Linear)
Network ID
Channel ID
Entertainment Asset ID Ad server 142 conducts near real time bidding for ad insertion during a program, also referred to as non-advertising content, as described earlier. The real time auction determines the "winning" creative from at least one ad buyer, taking into account genre of the entertainment, cable viewership data 138, ratings, targeting, etc. Ad server 142 accepts bids and selects a winning bid for the linear TV spot, and provisions an ad corresponding to the winning bid for a cable system operator to deliver to the cable delivery zone, after selecting the winning bid and before the airtime for the linear TV spot. Previously negotiated contracts "guarantee" that if a guaranteed contract holder bids for a particular ad slot, they are awarded a first look—any time they bid they get to place their ad in that slot. Preferred ad suppliers bid among themselves if no guaranteed ad has "won" the slot. Ads from a 'guaranteed' ad campaign are not required to outbid bidders in a 'preferred' bidding category. Backfill ads from the MVPD are added to the VMAP in cases in which no ad is returned by guaranteed or preferred bidders, to ensure that all ad slots are filled.

Campaign management delegate system 112 accepts the new content provided by a successful bidder, responsive to the placement request. Protocol for communication between ADM 158 and ADS 122 is described in detail in SCTE 130-3 2013: Digital Program Insertion—Advertising Systems Interfaces Part 3—Ad Management Service (ADM) Interface, which is incorporated herein in full, by reference. For the case in which an ad is not ready to deliver, ad decision service 122 polls the ad status stored in campaign management metadata 172. If the ad is not yet stored, campaign management delegate system 112 creates and adds a record to campaign management metadata 172. Ad encoder 132 encodes the ad and stores the encoded ad in ad repository 182, updates the status of the ad to "encoded" and stores the ad repository 182 location of the ad in campaign management metadata 172 so that the ad can be aired in a subsequent linear TV spot. The VMAP and encoded SD/HD video are made available for upload. When the ad is ready for delivery, campaign management delegate system 112 serves the ad and VMAP to broadcast cable provider 105. FTP service 162 sends the ADI for the file and the SD/HD video to broadcast cable provider 105, which ingests the ad. Broadcast cable provider 105 distributes the ad and VMAP within their system and updates the ADI to reflect the ingest status, marking the ad as active, also referred to as "hot", so ready to be delivered for viewing in real time. Campaign management delegate system 112 captures the status of the updated ADI and updates campaign management metadata 172.

Continuing the description of the block diagram of FIG. 2, airing ads 205 features campaign management delegate system 112 responding to the placement request with a placement response that includes reference to the new content. The ad placement is specified in VAST files in VMAP structure for delivery to the MVPD. Broadcast cable provider 105 stores audience history that reflects the viewership for the aired ad, in zone delivery logs 114 with event driven lists of viewing audience data, mapped to households and device identifiers for customers. If a future request from the MVPD for an ad matches the updated ADI for the creative, the ad can be served in real time. That is, the ad has been encoded and is available in both ad repository 182 and in the system of broadcast cable provider 105, so can be served in real time.

Further continuing the description of the block diagram of FIG. 2, processing engine 208 accesses the cable delivery zone logs 114 collected by the cable system operator corresponding to the linear TV spot, after airing of the ad, and processes the logs within ten minutes of receiving the logs for the linear TV spot. After delivering a created asset to the broadcast cable provider that plays the ad, a single impression pixel is logged that represents everyone watching that video on that channel at that time Impression pixel data for an ad that has been viewed features the fields listed next, in one example case.

Advertisement Identifier
Network
Channel
Entertainment Asset ID
Timestamp
Total Audience Size
Audience Segments
Audience Segment Sizes
MVPD Name
Ad Price Measured viewership calculator 248 extracts the current measured viewership also referred to as the total audience size during the linear TV spot, and price calculator 258 calculates an extended ad price for the linear TV spot, based on the measured viewership during the linear TV spot and the rate for the winning bid. Price reporting engine 268 reports to a winning bidder the extended price, within six hours of the airing of the ad.

In a first use case, in response to a placement request from the MVPD, campaign management delegate system 112 receives the request and runs an automated auction for advertising in the linear TV spot, at a time of five minutes or less before airtime for the linear TV spot, including announcing the linear TV spot, providing the past measured viewership data augmented with the demographic data, and setting a deadline for bidding. The bids are accepted for a rate that will be applied to measured viewership during the linear TV spot. The disclosed system accepts bids and selects a winning bid for the linear TV spot, and provisions an ad corresponding to the winning bid rate for a cable system operator to deliver to the cable delivery zone, after selecting the winning bid and before the airtime for the linear TV spot. Provisioning includes formatting and uploading the new content in time for playback with the entertainment content. Most real time programmatic placements occur within three minutes, with five to ten minutes possibly required for uploading higher resolution, larger video files—such as a rare, very long ad with a length of 45 seconds to a minute. Any of these times is substantially shorter than what is required for existing systems. After airing of the ad, the disclosed system accesses the zone delivery logs 114 collected by the broadcast cable provider 105 corresponding to the linear TV spot, and processes the logs within ten minutes of receiving the logs for the linear TV spot, calculating current measured viewership during the linear TV spot, and calculating an extended price for the linear TV spot, based on the measured viewership during the linear TV spot and the rate for the winning bid. The system reports to a winning bidder the extended price, within six hours of the airing of the ad.

In a second use case, ad content is received and prepared by campaign management delegate system 112 from a prospective bidder, in anticipation of the prospective bidding on a placement request from a broadcast cable provider. When a placement request is received from the broadcast cable provider, campaign management delegate system 112 conducts real time bidding for ad insertion during a program described in the placement request, identifies the prospective bidder as successful and automatically uploads the bidder's new content to the broadcast cable provider.

In a third use case, ad content is received, prepared and uploaded by campaign management delegate system 112 from a prospective bidder, in anticipation of the prospective bidding on a placement request from a broadcast cable provider. Campaign management delegate system 112 responds to a received placement request from the broadcast cable provider by conducting real time bidding for ad insertion and identifies a successful bidder, and sends a placement response that includes reference to the new content from the bidder.

FIG. 3A shows an example entry for a cable delivery zone log, for broadcast 314 source type, on channel ID 50469 316.

FIG. 3B shows an example AMS placement request 342 from a broadcast cable provider 105 for ad insertion into a program. The placement request includes fields for specifying ad slot time 344 and ad break length 346, as well as fields for zone 348 to specify viewer region and network id 352, number of slots 354 for total ads allowed and ad length field 356 for ad duration restriction specification.

FIG. 3C shows a single impression pixel made available after the created asset is delivered to the broadcast cable provider that plays the ad. Entertainment asset ABC123 366 with Ad ID 12 368 represents the actual audience size of 13,400 376 who watched that video on that channel at that time.

FIG. 4A and FIG. 4B show an example metadata file in ADI format for a creative asset 404. The asset metadata file features fields for the asset name 414 and asset ID 425, and lists the features of the creative, including that the ad is available in both HD and SD formats 428, and was created by CCH Creative 446, ad creation agency. The ad has a G rating 434 and is in the field of help and services 456.

FIG. 5A-5E list an example video multiple ad playlist (VMAP) of video ad serving templates (VAST). The schema for recording the impressions is listed in lines 12 through 17 of the VAST 542. VMAP 504 includes multiple VASTs called out in line 5 514 for ad ID "21252" and code line 86 543 for ad ID "21242". Information is included in the VMAP for the creatives, including duration of a creative 564. Lines 53 and 57 specify resolutions associated with assets 568. Lines 69 and 76 specify time offsets 538 associated with ad breaks.

Computer System

Figure 6:
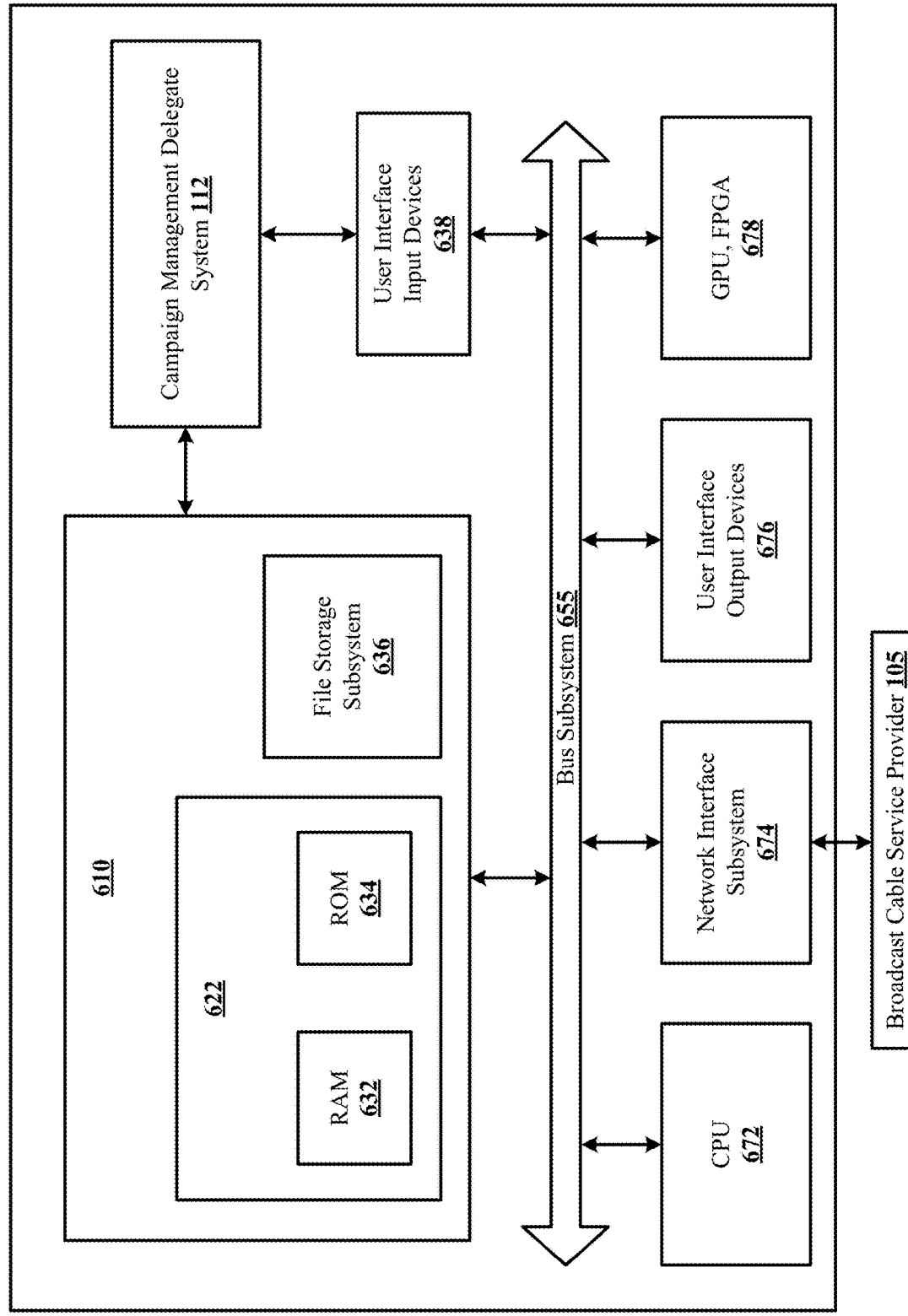
FIG. 6 illustrates a simplified block diagram of a computer system that can be used for streamlining use of the SCTE 130 framework for delivering and closing out viewership priced spots in zoned cable delivery of linear TV, according to one embodiment of the disclosed technology.

FIG. 6 is a simplified block diagram of a computer system 600 that can be used for streamlining use of Society of Cable Telecommunications Engineers (SCTE) 130 framework for delivering and closing out viewership priced spots in zoned cable delivery of linear TV. Computer system 600 includes at least one central processing unit (CPU) 672 that communicates with a number of peripheral devices via bus subsystem 655, for providing real time advertising services described herein. These peripheral devices can include a storage subsystem 610 including, for example, memory devices and a file storage subsystem 636, user interface input devices 638, user interface output devices 676, and a network interface subsystem 674 that connects to broadcast cable provider 105. The input and output devices allow user interaction with computer system 600. Network interface subsystem 674 provides an interface to outside networks, including an interface to corresponding interface devices in other computer systems.

In one implementation, campaign management delegate system 112 of FIG. 1 is communicably linked to the storage subsystem 610 and the user interface input devices 638.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein. Subsystem 678 can be graphics processing units (GPUs) or field-programmable gate arrays (FPGAs).

Memory subsystem 622 used in the storage subsystem 610 can include a number of memories including a main random access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple busses.

Computer system 600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or less components than the computer system depicted in FIG. 6.

Particular Implementations

Some particular implementations and features for streamlining use of Society of Cable Telecommunications Engineers (SCTE) 130 framework for delivering and closing out viewership priced spots in zoned cable delivery of linear TV are described in the following discussion.

In one disclosed implementation, a method for delivering and closing out viewership priced spots in zoned cable delivery of linear TV, includes assembling past measured viewership data within a cable delivery zone for a linear TV spot, in a linear TV program, by aggregating records in a cable delivery zone log and augmenting at least selected portions of the aggregated logs with demographic data for viewers or households identified in the delivery zone logs. The disclosed method also includes running an automated auction for advertising in the linear TV spot, at a time of five minutes or less before airtime for the linear TV spot, including announcing the linear TV spot, providing the past measured viewership data augmented with the demographic data, and setting a deadline for bidding, wherein bids are accepted for a rate that will be applied to measured viewership during the linear TV spot. The method further includes accepting bids and selecting a winning bid for the linear TV spot, provisioning an ad corresponding to the winning bid for a cable system operator to deliver to the cable delivery zone, after selecting the winning bid and before the airtime for the linear TV spot, and after airing of the ad, accessing the cable delivery zone logs collected by the cable system operator corresponding to the linear TV spot. The disclosed method also includes processing the logs within ten minutes of receiving the logs for the linear TV spot, calculating current measured viewership during the linear TV spot, and calculating an extended price for the linear TV spot, based on the measured viewership during the linear TV spot and the rate for the winning bid and reporting to a winning bidder the extended price, within six hours of the airing of the ad.

The system described in this section and other sections of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this method can readily be combined with sets of base features identified as implementations.

Some implementations of the method further include running the automated auction within five seconds of the airtime for the linear TV spot and keeping the auction open for one second or less. Some implementations of the method also further include receiving a most favorable bid corresponding to an ad not yet loaded, automatically loading the ad and readying it to air in a subsequent linear TV spot, and selecting as the winning bid another bid corresponding to an already loaded ad for airing in the linear TV spot.

In one implementation of the method, the past measured viewership includes data for a prior day. In another implementation, the past measured viewership includes data distributed over at least a prior week. In yet another case, the past measured viewership includes data distributed over at least a prior month. For some implementations of the disclosed method, for a seasonally or event-impacted linear TV spot, measured viewership for an equivalent past seasonally or event-impacted linear TV spot and the past measured viewership data distributed over at least a month.

Other implementations of the disclosed technology described in this section include a tangible non-transitory computer readable storage media loaded with program instructions that, when executed on one or more processors, are configurable for delivering and closing out viewership priced spots in zoned cable delivery of linear TV. Yet another implementation of the disclosed technology described in this section can include a computer implemented system including a processor, memory coupled to the processor and the computer instructions from the non-transitory computer readable storage media loaded into the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method, compatible with SCTE-130, for delivering and closing out viewership priced spots in zoned cable delivery of linear TV, including:
    a campaign management delegate system assembling from a cable provider system past measured viewership data within a cable delivery zone for a linear TV spot, in a linear TV program, by aggregating records in a cable delivery zone log and augmenting at least selected portions of the aggregated logs with demographic data for viewers or households identified in the delivery zone logs;
    the campaign management delegate system running an automated auction for advertising in the linear TV spot, at a time of five minutes or less before airtime for the linear TV spot, including announcing the linear TV spot via an Ad Decision Service (ADS), providing the past measured viewership data augmented with the demographic data, and setting a deadline for bidding, wherein bids are accepted for a rate that will be applied to measured viewership during the linear TV spot;
    the campaign management delegate system accepting bids from ad provider systems via an Ad Management Service (ADM) or other bidding component, and selecting a winning bid for the linear TV spot;
    provisioning an ad corresponding to the winning bid for a cable system operator to deliver to the cable delivery zone, after selecting the winning bid and before the airtime for the linear TV spot;
    after airing of the ad by the cable provider system, accessing the cable delivery zone logs collected by the cable system operator from consumer premises equipment corresponding to the linear TV spot;
    the campaign management delegate system processing the logs within ten minutes of receiving the logs for the linear TV spot, calculating current measured viewership during the linear TV spot, and calculating an extended price for the linear TV spot, based on the measured viewership during the linear TV spot and the rate for the winning bid; and
    reporting to a winning bidder the extended price, within six hours of the airing of the ad.

2. The method of claim 1, further including running the automated auction within five seconds of the airtime for the linear TV spot and keeping the auction open for one second or less.

3. The method of claim 1, further including
    receiving a most favorable bid corresponding to an ad not yet loaded,
    automatically loading the ad and readying it to air in a subsequent linear TV spot, and
    selecting as the winning bid another bid corresponding to an already loaded ad for airing in the linear TV spot.

4. The method of claim 1, further including in the past measured viewership, data for a prior day.

5. The method of claim 1, further including in the past measured viewership, data distributed over at least a prior week.

6. The method of claim 1, further including in the past measured viewership, data distributed over at least a prior month.

7. The method of claim 1, further including, for a seasonally or event-impacted linear TV spot, measured viewership for an equivalent past seasonally or event-impacted linear TV spot and the past measured viewership data distributed over at least a month.

8. A tangible non-transitory computer readable storage media loaded with program instructions, compatible with SCTE-130 systems, that, when executed on one or more processors, are configurable for delivering and closing out viewership priced spots in zoned cable delivery of linear TV, including:
    a campaign management delegate system assembling from a cable provider system past measured viewership data within a cable delivery zone for a linear TV spot, in a linear TV program, by aggregating records in a cable delivery zone log and augmenting at least selected portions of the aggregated logs with demographic data for viewers or households identified in the delivery zone logs;
    the campaign management delegate system running an automated auction for advertising in the linear TV spot, at a time of five minutes or less before airtime for the linear TV spot,
    including announcing the linear TV spot via an Ad Decision Service (ADS), providing the past measured viewership data augmented with the demographic data, and setting a deadline for bidding, wherein bids are accepted for a rate that will be applied to measured viewership during the linear TV spot;
    the campaign management delegate system accepting bids from ad provider systems via an Ad Management Service (ADM) or other bidding component and selecting a winning bid for the linear TV spot;
    the campaign management delegate system provisioning an ad corresponding to the winning bid for a cable system operator to deliver to the cable delivery zone, after selecting the winning bid and before the airtime for the linear TV spot;
    after airing of the ad by the cable provider system, accessing the cable delivery zone logs collected by the cable system operator from consumer premises equipment corresponding to the linear TV spot;
    the campaign management delegate system processing the logs within ten minutes of receiving the logs for the linear TV spot, calculating current measured viewership during the linear TV spot, and calculating an extended price for the linear TV spot, based on the measured viewership during the linear TV spot and the rate for the winning bid; and
    reporting to a winning bidder the extended price, within six hours of the airing of the ad.

9. The tangible non-transitory computer readable storage media of claim 8, further including running the automated auction within five seconds of the airtime for the linear TV spot and keeping the auction open for one second or less.

10. The tangible non-transitory computer readable storage media of claim 8, further including:
    receiving a most favorable bid corresponding to an ad not yet loaded,
    automatically loading the ad and readying it to air in a subsequent linear TV spot, and
    selecting as the winning bid another bid corresponding to an already loaded ad for airing in the linear TV spot.

11. The tangible non-transitory computer readable storage media of claim 8, further including in the past measured viewership, data for a prior day.

12. The tangible non-transitory computer readable storage media of claim 8, further including in the past measured viewership, data distributed over at least a prior week.

13. The tangible non-transitory computer readable storage media of claim 8, further including in the past measured viewership, data distributed over at least a prior month.

14. The tangible non-transitory computer readable storage media of claim 8, further including, for a seasonally or event-impacted linear TV spot, measured viewership for an equivalent past seasonally or event-impacted linear TV spot and the past measured viewership data distributed over at least a month.

15. A computer-implemented system including a processor and the non-transitory computer readable storage media of claim 8, coupled to the processor and loaded with the program instructions.

16. The system of claim 15, further including program instructions that implement running the automated auction within five seconds of the airtime for the linear TV spot and keeping the auction open for one second or less.

17. The system of claim 15, further including program instructions that implement:
    receiving a most favorable bid corresponding to an ad not yet loaded,
    automatically loading the ad and readying it to air in a subsequent linear TV spot, and
    selecting as the winning bid another bid corresponding to an already loaded ad for airing in the linear TV spot.

18. The system of claim 15, further including in the past measured viewership, data for a prior day.

19. The system of claim 15, further including in the past measured viewership, data distributed over at least a prior week.

20. The system of claim 15, further including, for a seasonally or event-impacted linear TV spot, measured viewership for an equivalent past seasonally or event-impacted linear TV spot and the past measured viewership data distributed over at least a month.

* * * * *